US005745705A

United States Patent [19]

Iguchi

[11] Patent Number: 5,745,705
[45] Date of Patent: Apr. 28, 1998

[54] POS SYSTEM

[75] Inventor: Kesayoshi Iguchi, Fujisawa, Japan

[73] Assignee: Matsushita Electric Industrial Co., Ltd., Osaka, Japan

[21] Appl. No.: 571,491

[22] Filed: Dec. 13, 1995

[30]    Foreign Application Priority Data

May 12, 1995    [JP]    Japan .................................. 7-114159

[51] Int. Cl.⁶ .................................................. G06F 17/60
[52] U.S. Cl. ........................ 395/221; 395/220; 395/216; 395/200.1; 395/200.05; 235/383
[58] Field of Search ................................... 395/220, 216, 395/221, 652, 653, 200.05, 200.1; 340/825.35; 235/385, 383

[56]    References Cited

U.S. PATENT DOCUMENTS

| | | | |
|---|---|---|---|
| 4,468,750 | 8/1984 | Chamoff et al. | 395/200.01 |
| 4,502,120 | 2/1985 | Ohnishi et al. | 395/221 |
| 4,841,442 | 6/1989 | Hosoyama | 395/220 |
| 4,843,546 | 6/1989 | Yoshida et al. | 395/220 |
| 5,119,294 | 6/1992 | Tanaka | 395/221 |
| 5,544,041 | 8/1996 | Nekomoto | 395/201 |

*Primary Examiner*—Robert A. Weinhardt
*Assistant Examiner*—Krishna Kalidindi
*Attorney, Agent, or Firm*—Watson Cole Stevens Davis, P.L.L.C.

[57]    ABSTRACT

In order to facilitate the maintenance and enable to update a program, data, etc. anytime, a POS system has a plurality of registers for entering orders and processing accounts, and a controller for sales management, connected by a communication line to each of the registers, for managing sales of the whole store and setting items, unit prices, etc., wherein the controller for sales management has a maintenance control block including a section for setting and storing maintenance data, a section for detecting that the power supply to a register is turned on to execute an opening process, and a section for sending, when the turning on of power is detected, maintenance data to the register to update the executable program and/or various setting data of the register in the case where there is the maintenance data.

4 Claims, 15 Drawing Sheets

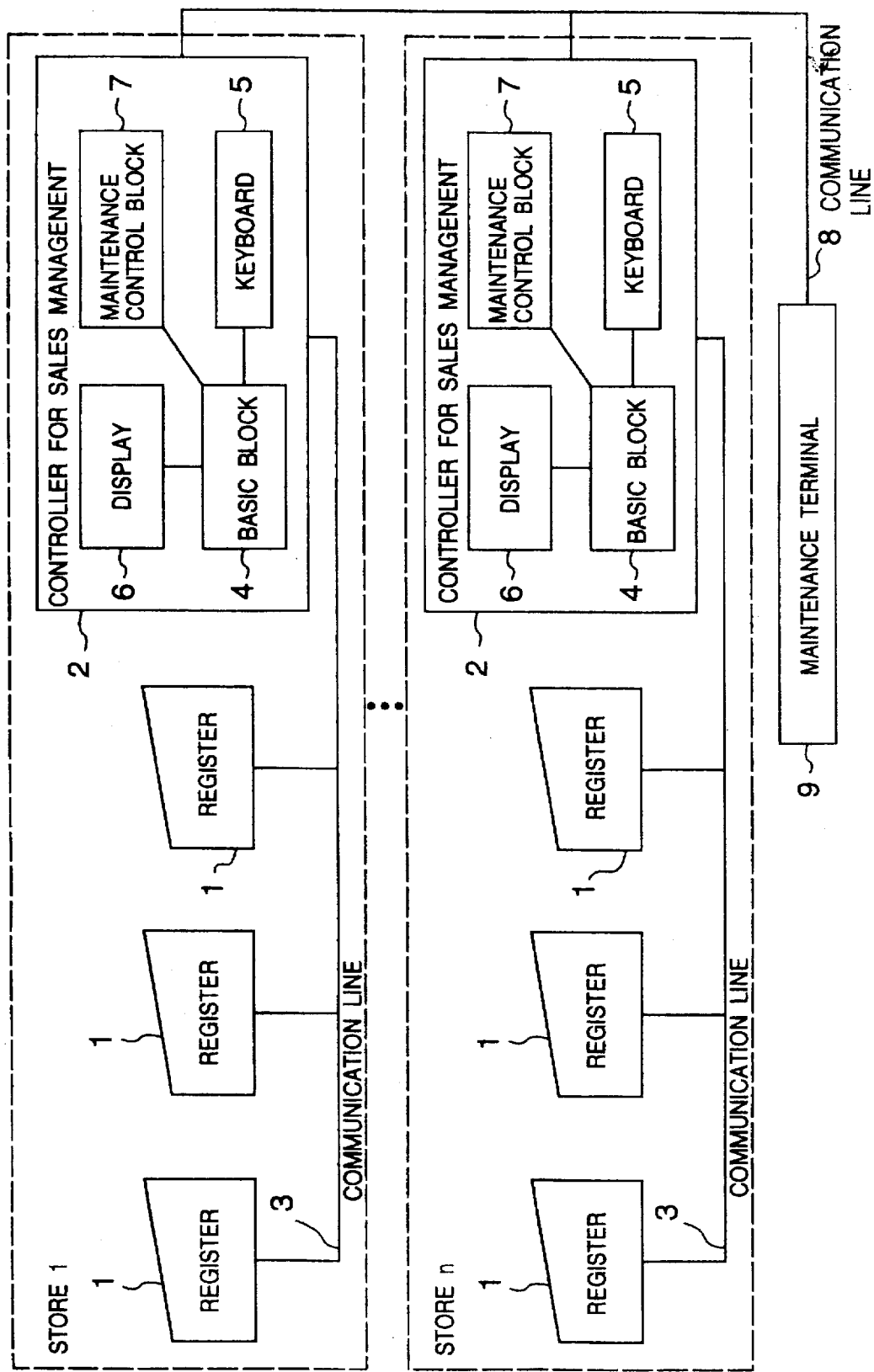

POS SYSTEM

BACKGROUND OF THE INVENTION

1. Field of the Invention

The present invention relates to POS (point of sales) system which facilitates the maintenance of an execute program and various setting data.

2. Description of the Related Art

FIG. 10 shows a composition of the conventional POS system in a store. In FIG. 10, reference numeral 101 denotes registers for entering orders and processing accounts, and each register is assigned a number. Reference numeral 102 denotes a controller for sales management, that is, for managing sales of the whole store and setting names of items, unit prices, etc., and 103 denotes a communication line connecting the respective registers 101 with the controller for sales management 102. The controller for sales management includes a basic block 104, a keyboard 105, and a display 106.

FIG. 11 shows an example of the memory layout of the conventional register 101. In FIG. 11, reference numeral 111 denotes an area for storing an executable program (control program) of a register, and 112 denotes an area for storing sales data. The sales data area 112 includes an accounting data area for storing a total of cash sales, a total of taxes, etc., an item-classified sales data area for storing the sales quantity, amount, etc. of each item, time period sales data area for storing the sales quantities, amounts, etc. of the time zones, a customer-stratified sales area for storing the sales quantities, amounts, etc. of the customer groups, and so on. Reference numeral 113 denotes an area for storing setting data, the setting data being kinds and unit prices of items and other setting values.

FIG. 12 shows an example of the memory layout of the conventional controller for sales management 102. In FIG. 12, reference numeral 121 denotes an area for storing an executable program of the controller for sales management, 122 denotes an area for storing sales proceeds of the whole store, 123 denotes an area for storing sales data of register No. 1, 124 denotes an area for storing sales data of register No. 2, 125 denotes an area for storing sales data of register No. n, 126 denotes an area for storing setting data currently in use, such as names and unit prices of items, a receipt message, etc., and 127 denotes an area for storing setting data to be used in the future, namely, setting data to be used after updating.

FIG. 13 is a flowchart showing the flow of control operation of the conventional controller for sales management 102. Reference numeral 131 denotes a step of deciding whether a store opening process has been executed, 132 denotes a step of deciding whether a closing process command has arrived, 133 denotes a step of executing a store opening process, 134 denotes a step of adding up sales proceeds, 135 denotes a step of deciding whether an opening process command has arrived, 136 denotes a step of a store closing process, 137 denotes a store opening process routine, 138 denotes a sales process routine, and 139 denotes a store closing process routine.

FIG. 14 is a flowchart showing the flow of control operation of the conventional controller for sales management 102. Reference numeral 141 denotes a step of deciding whether the opening process has been executed and, 142 denotes a step of deciding whether an opening process command has arrived, 143 denotes a step of executing the opening process, 144 denotes a step of a sales job, 145 denotes a step of deciding whether a closing process command has arrived, 146 denotes an opening process routine, and 147 denotes a sales process routine.

The above-mentioned example of prior art will be described in the following. In a POS system, when starting to enter sales records, an opening process is done. By executing the opening process, the area for sales data is cleared, the receipt No. is initialized, various setting data is transmitted to the registers and a date, time, etc. are transmitted to the registers so that sales can be started with the POS system in the initialized state. In a closing process, sales data from the registers is collected, a general sales report, an item-classified sales report, a customer-stratified sales report, a time period sales report, and so on, including totals of each register and each store are prepared and printed out. Sales data is added up weekly and monthly in the summing-up area, and if the POS system is connected to a host computer, files for use in the host computer are prepared.

In FIG. 10, the registers 101 are used to enter orders, and process accounts, and as the registers 101 finish the accounting operations, sales data is collected to the sales data areas 112 in the registers 101. The registers 101 send sales data and the register numbers through the communication line 103 to the controller for sales management 102, and the sales data is collected in a store sales data area 122 (FIG. 12) and the respective registers sales data areas 123 to 125 (FIG. 12) in the internal memory of the controller for sales management 102.

The controller for sales management 102 sums up sales data of each register, and on the other hand, sets the names and unit prices of items, and other items such as a receipt message. To change the settings, the contents of the currently-used setting data area 126 (FIG. 12) in the controller 102 for sales management are copied to the area 127 (FIG. 12) for storing future setting data, and only portion thereof which needs to be altered is altered and stored in this area 127. For example, when the unit price of an item is to be changed, the item master file is copied from the setting data area 126 to the future setting data area 127, and since the item master file has divisions of item code, item name, unit price, tax, etc., all data in the item master file is not changed, but only the unit price is changed with the other items remaining unchanged.

When the day's business is started in the store, the opening process of the POS system is executed under the control of the basic block 104 in the controller for sales management 102 and the sales data in the registers 101 and the controller for sales management 102 are erased, and at the same time, to update the item unit prices to be used for the day, the future setting data 127 in the controller for sales management 102 is copied to the setting data area 113 in each register 101 and also to the currently-used setting data area 126 in the controller for sales management 102.

By this opening process, data in various registers in the store are synchronized, and the sales operation is started. When the day's sales operation is closed, a closing process of the POS system, which is the exact calculation of sales proceeds on the day, is done.

In FIG. 13, when the power supply to the controller for sales management is turned on, at step 131 a decision is made whether an opening process has been executed, and if the decision is that an opening process has been executed, the flow jumps to step 134 for adding up sales proceeds. If the opening process has been unexecuted, at step 132 of deciding whether an opening process command has arrived, waiting continues until an opening process command is issued, and when an opening process command is issued, at step 133 an opening process command and setting data are sent to the respective registers through the communication line. The sales data areas 122 to 125 in the controller for sales management, shown in FIG. 12, are cleared, the future setting data 127 is copied to the currently-used data area 126. In an ordinary POS system, this opening process command can be issued either from a register 101 or from the controller for sales management 102 (FIG. 10).

In step 134 for adding up sales proceeds, sales data sent from the registers is summed up, the future setting data is set when it is necessary, then at step 135 a decision is made whether a closing process command has arrived, and if this command has not arrived, the flow jumps moves back to step 134 of adding up sales proceeds and repeats steps 134 and 135 until a closing process command arrives. When a closing process command arrives, at step 136 the controller issues a closing process command to each register through the communication line, and prepares and prints out a report on sales data. When a closing process is finished, the flow goes back to step 132.

In FIG. 14, when the power supply to a register is turned on, at step 141 a decision is made whether an opening process has been executed, and if a closing process has been executed, the flow advances to step 144. If a closing process has been unexecuted, at step 142 the register waits for an opening process command, and when an opening process command is issued, at step 143 received setting data is copied to the setting data area 113 (FIG. 11), and the sales data area 112 (FIG. 11) is cleared. Then, at step 144 a sales job is done, and sales data is sent to the controller for sales management, at step 145 a decision is made whether a closing process command has arrived, and if this command has not arrived, the flow advances to step 144 of summing up sales, and steps 144 and 145 are repeated until a closing process command arrives. When a closing process command arrives, the flow moves back to step 142.

A program to control a series of operations mentioned above is stored in an executable program storage area 111 (FIG. 11) in the registers and also in an executable program storage area 121 (FIG. 12).

When the function of the POS system is to be upgraded, it is necessary to alter the executable program and setting data. The executable program and setting data are altered by modifying the contents of the hard disk, floppy disk, memory card or the like mounted in the equipment. Therefore, if such a storage medium is replaced during the opening hours of the store, the work in the store is disrupted and the matching of data is lost, so that the replacement work is done at night after the closing job of the store is finished.

In the conventional POS system, too, when the executable program and setting data are to be changed, they can be changed by doing the replacement work of data in the devices after the store operation is finished.

However, in the above-mentioned example of prior art, if maintenance is carried out which is to alter the executable program and setting data, in order to keep the matching of data and not to disrupt the store operation, it is necessary to do the replacement work at night after the closing job of the store is finished, and consequently there is a problem that the maintenance personnel expenses are greater than in the case where the work is done in the daytime.

In the case of a store chain including a number of stores, it is necessary to do replacement work in all the stores simultaneously, and for this reason, there is another problem that it is necessary to secure a large number of maintenance personnel so that they can be dispatched to the stores concerned to alter data at the same time on the evening prior to the day when new data is required.

The present invention has been made to solve those problems and has as its object to provide a POS system which enables the executable program and setting data to be altered at any time.

SUMMARY OF THE INVENTION

In order to achieve the above object, according to the present invention, a maintenance control block is provided in the controller for sales management, there are provided a function to set data for updating in the controller in advance and a function to decide, at the time of opening process, whether there is maintenance data, and when there is maintenance data, the executable program and various items of setting data in the registers are automatically replaced when an opening process is executed, thereby obviating the need of work at night.

According to the present invention, an effective date which permits maintenance work to be done may be set and stored, so that many maintenance personnel need not be deployed to finish off the maintenance work within the day previous to the day when new data is required.

Furthermore, by transmitting data through a public line of telecommunication, data may be altered by remote control without dispatching maintenance personnel to the stores concerned.

Therefore, according to the present invention, it is possible to alter the executable program and various items of setting data at any time, for which reason the night work need not be done, so that the maintenance cost can be reduced and the burden on the maintenance personnel can be alleviated.

Another effect of the present invention is that an effective date for executing maintenance can be set and stored, and data replacement work can be done in all the stores concerned simultaneously, so that it is unnecessary to secure a large number of maintenance personnel.

Yet another effect of the present invention is that by using the public line of telecommunication or the like, maintenance personnel need not be sent to the stores on a business trip.

BRIEF DESCRIPTION OF THE DRAWINGS

FIG. 8 is a schematic block diagram showing the composition of the POS system according to a third embodiment of the present invention;

Figure 1:
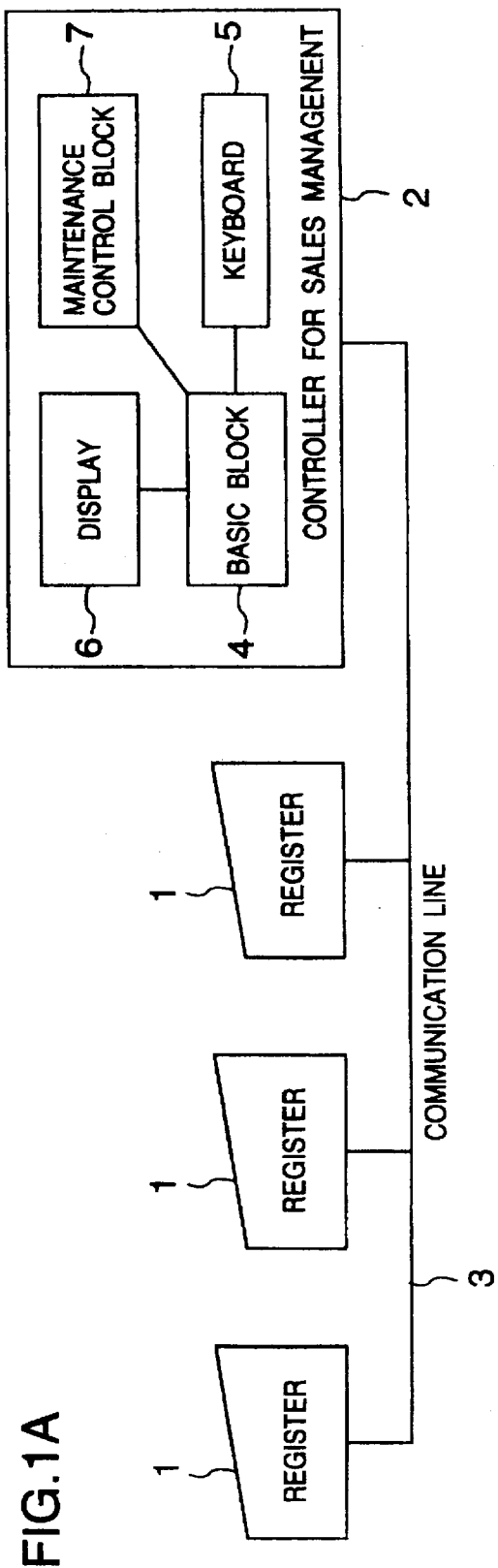
FIG. 1A is a schematic block diagram showing the composition of the POS system according to a first embodiment of the present invention.
FIG. 1B is a schematic block diagram showing the composition of the maintenance control block of the controller for sales management in the POS system.

DESCRIPTION OF THE PREFERRED EMBODIMENTS (First Embodiment)

Embodiments of the present invention will be described with reference to the accompanying drawings. FIGS. 1A and 1B show the compositions of the POS system according to a first embodiment of the present invention. In FIG. 1A, reference numeral 1 denotes registers for entering orders and processing accounts, each register is designated by a number. Reference number 2 denotes a controller for sales management for managing sales and setting the names and unit prices of items, 3 denotes a communication line connecting between the registers and the controller for sales management. The controller for sales management 2 includes a basic block 4, a keyboard 5, a display 6, and a maintenance control block 7. As shown in FIG. 1B, the maintenance control block 7 includes a maintenance data setting and storage means 7a for setting and storing maintenance data, a register power-on detecting means 7b for detecting the turning on of the power supply at the register 1 to execute an opening process, and a maintenance data sending and updating means 7c for sending maintenance data to the register 1 when there is maintenance data the moment the power supply is turned on and updating the executable program and various items of setting data at register 1.

Figure 2:
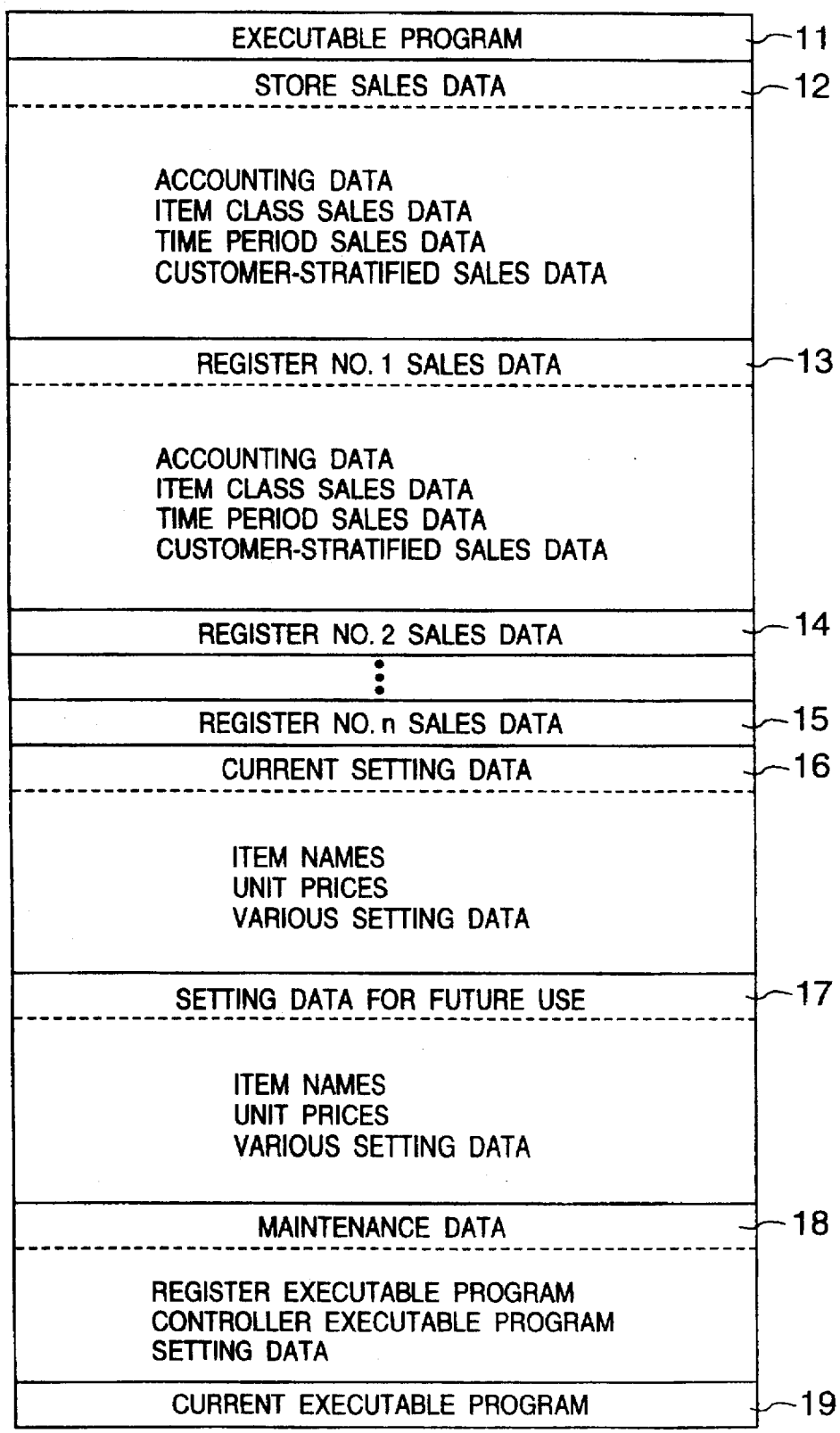
FIG. 2 is a schematic block diagram showing the memory layout of the controller for sales management according to the first embodiment of the present invention.

FIG. 2 shows the memory layout of the controller for sales management in this first embodiment. In FIG. 2, reference numeral 11 denotes an area for storing an execution program (control program) of the controller for sales management, 12 denotes an area for storing sales data of the whole store, 13 denotes an area for storing sales data at register No. 1, 14 denotes an area for storing sales data at register No. 2, 15 denotes an area for storing sales data at register No. n, 16 denotes an area for storing setting data such as names and unit prices of items, and a receipt message currently in use, 17 denotes an area for storing setting data to be used in future, 18 denotes an area for storing maintenance data, and 19 denotes an area for storing an executable program currently in use at the registers.

Figure 11:
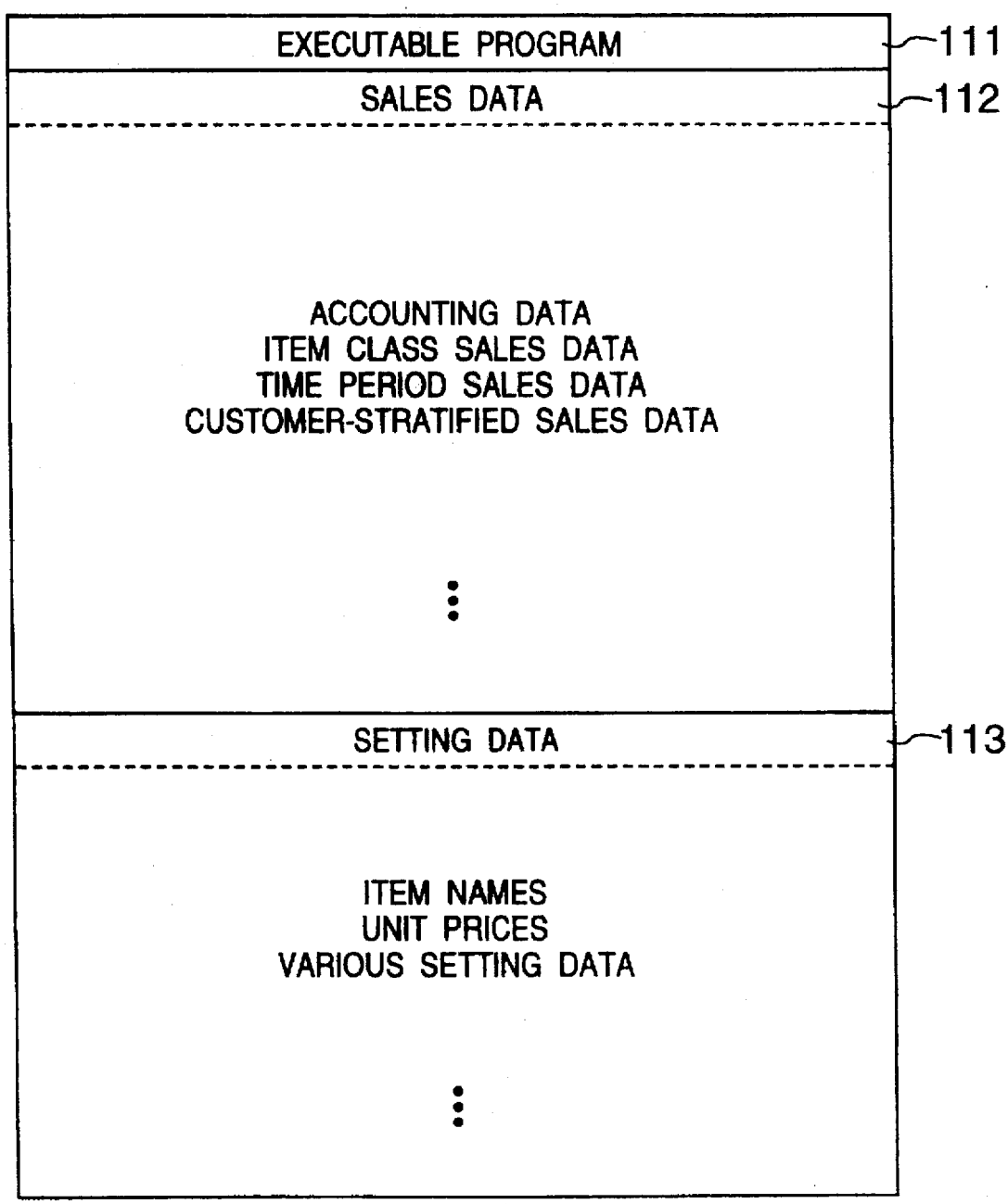
FIG. 11 is a schematic diagram showing the memory layout of the conventional register.
Figure 12:
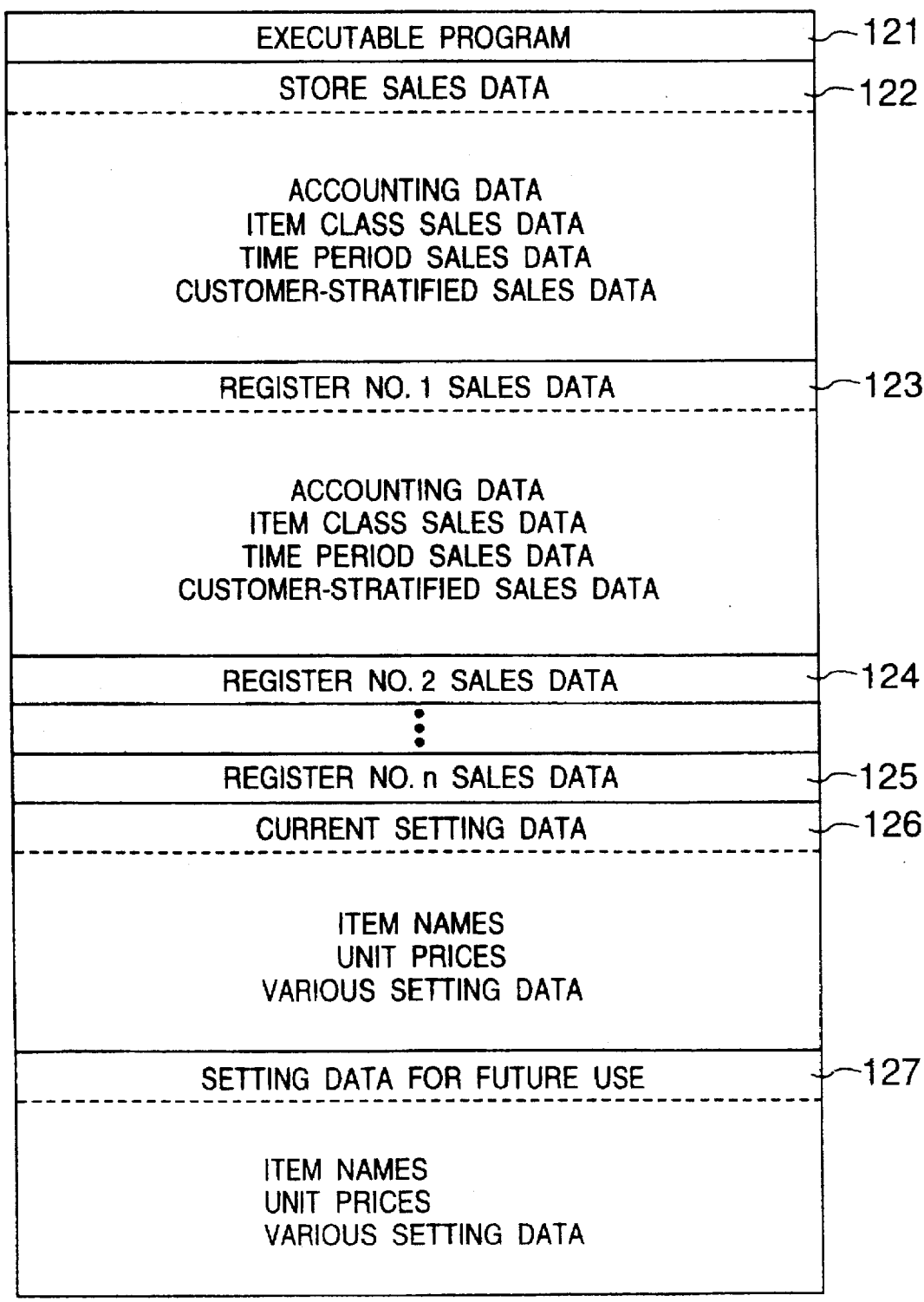
FIG. 12 is a schematic diagram showing the memory layout of the conventional controller for sales management.
Figure 13:
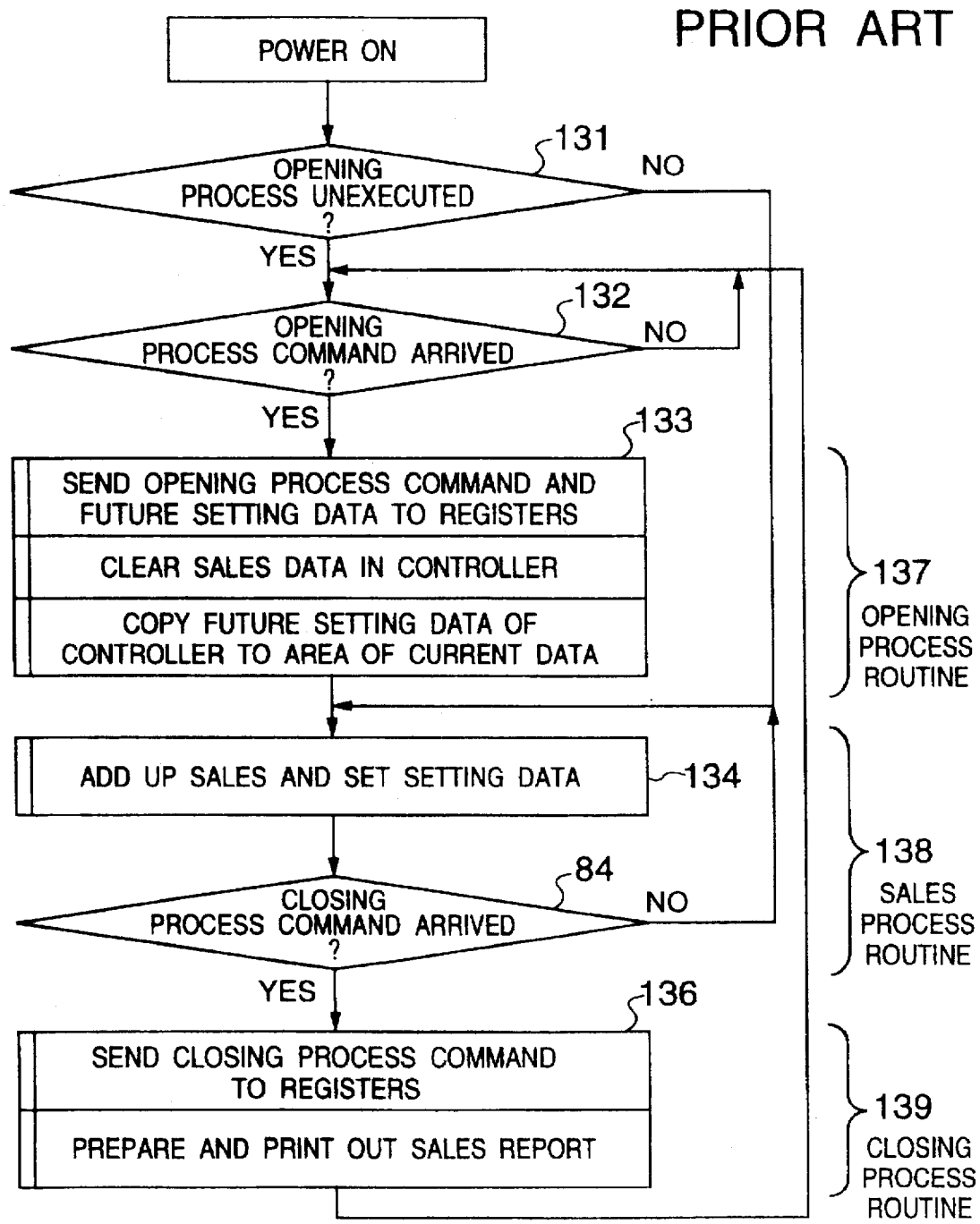
FIG. 13 is a flowchart showing the operation of the conventional controller for sales management.
Figure 14:
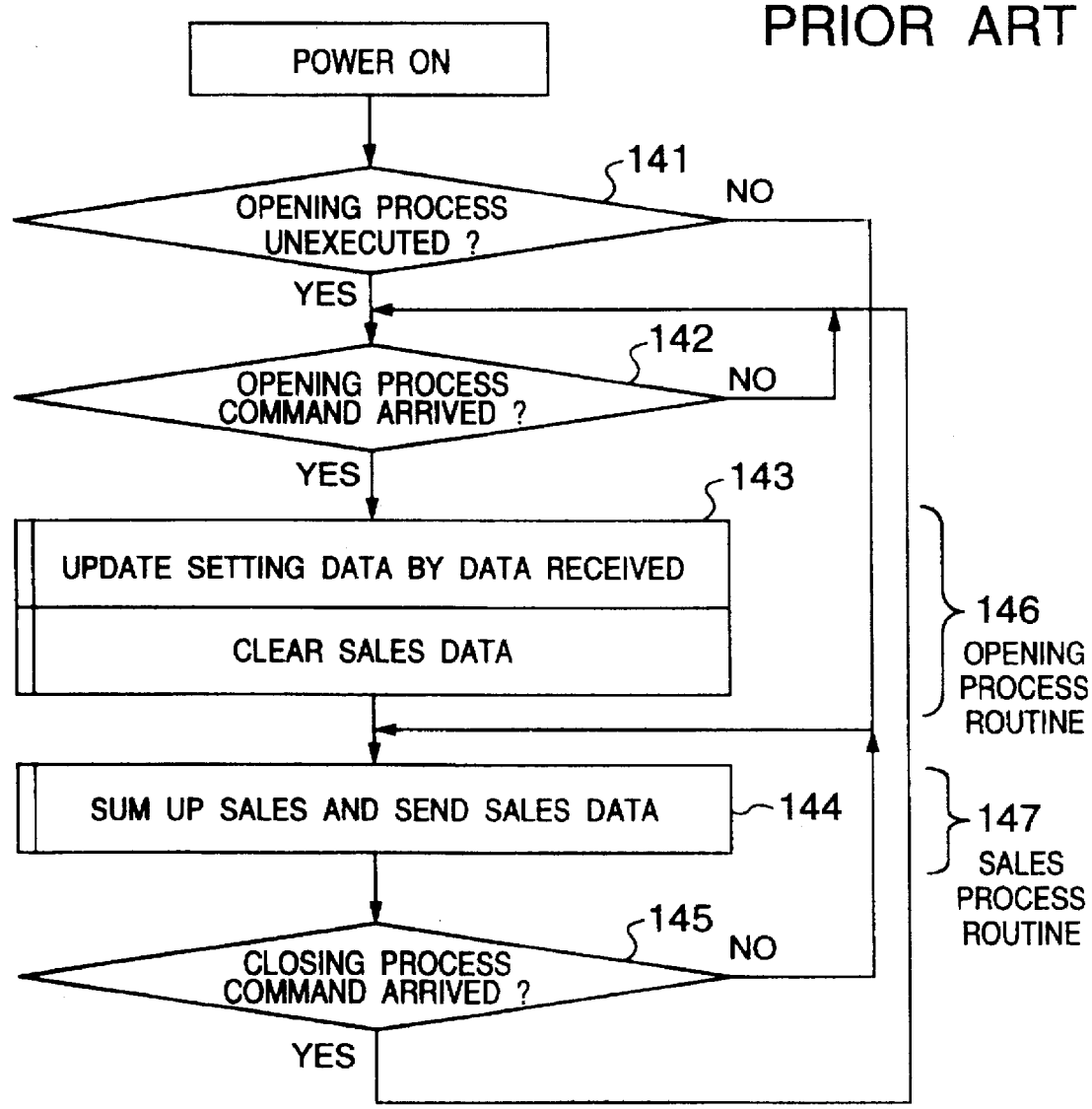
FIG. 14 is a flowchart showing the operation of the conventional register.

The memory layout of each register is the same as in the conventional example shown in FIG. 11.

Figure 3:
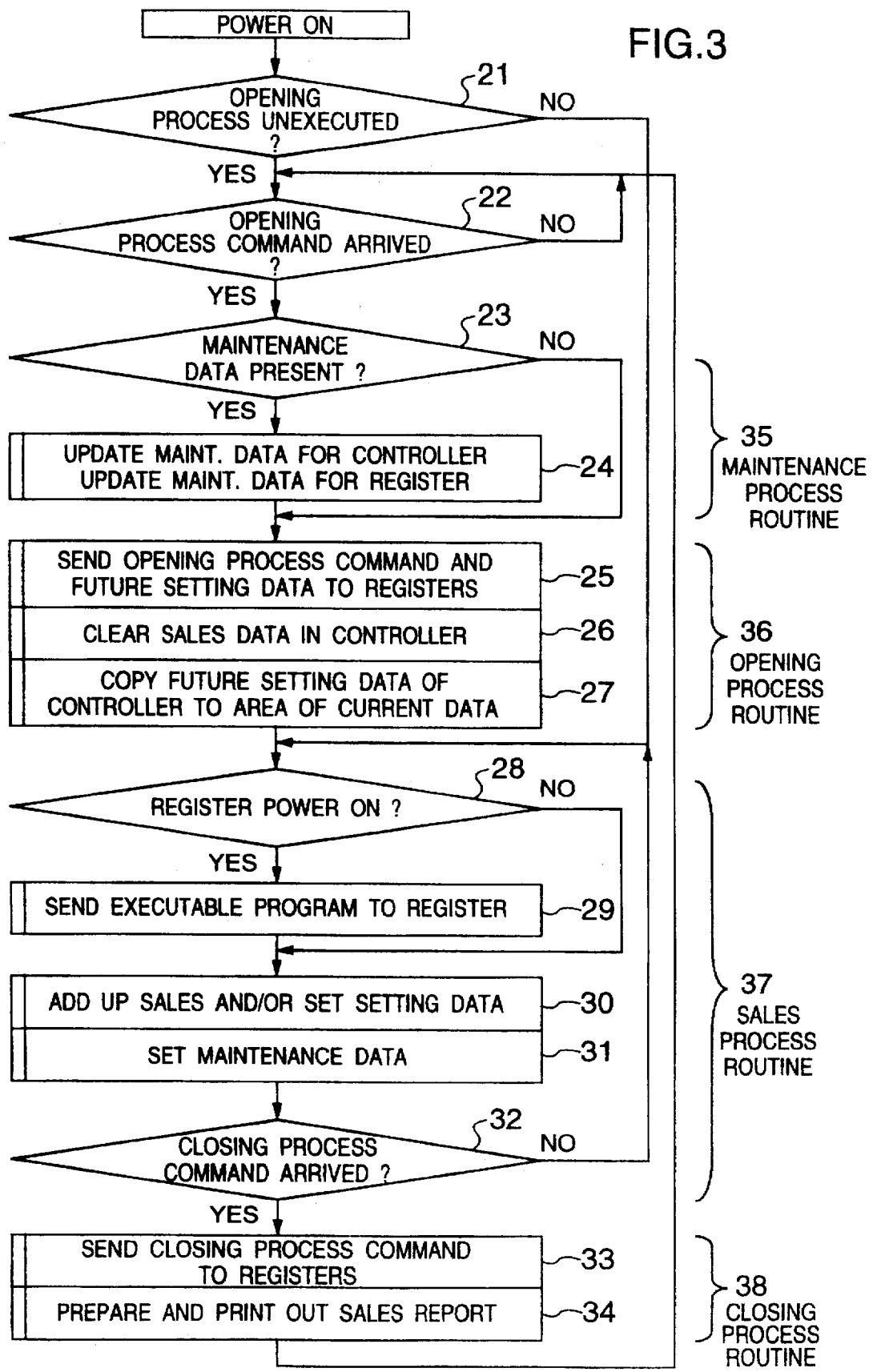
FIG. 3 is a flowchart showing the operation of the controller for sales management according to the first embodiment of the present invention.

FIG. 3 is a flowchart showing the flow of control operation in the controller for sales management. Reference numeral 21 denotes a step for deciding whether an opening process has been executed, 22 denotes a step for deciding whether an opening process command has arrived, steps 23 and 24 constitute a maintenance process routine 35, steps 25 to 27 constitute an opening process routine 36, steps 28 to 32 constitute a sales process routine 37, and steps 33 and 34 constitute a closing process routine 38.

Figure 4:
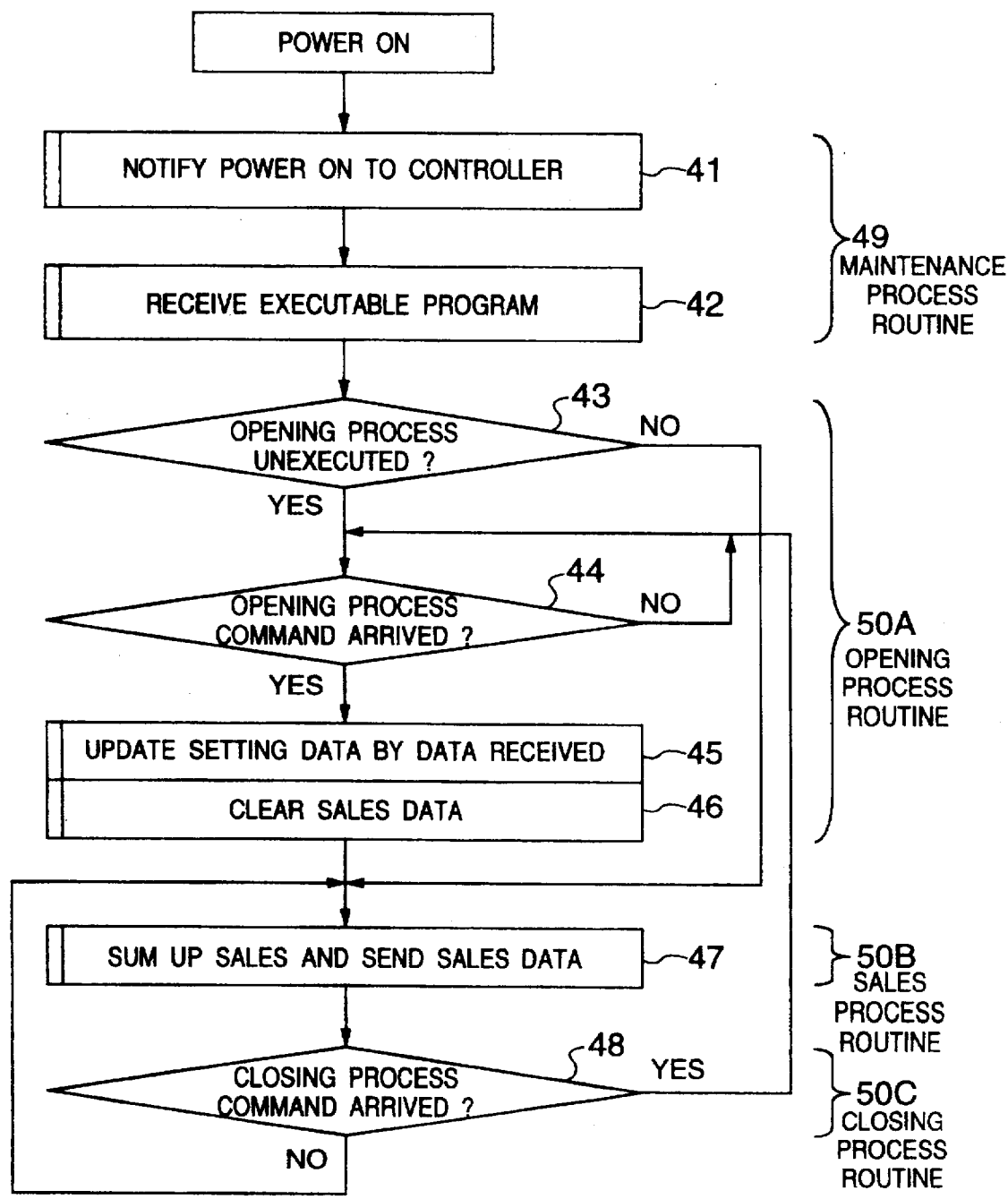
FIG. 4 is a flowchart showing the operation of the registers according to the first embodiment of the present invention.

FIG. 4 is a flowchart showing the flow of control operation in the registers in this embodiment. Steps 41 and 42 constitute a maintenance process routine 49, steps 43 to 46 constitute an opening process routine 50A, step 47 is a sales process routine 50B, and step 48 is a closing process routine 50C.

With reference to FIGS. 1 to 3, the operation in the first embodiment will be described. In FIG. 3, when the power supply to the controller 2 for sales management is turned on, at step 21 a decision is made whether an opening process has been executed, and if an opening process has been unexecuted, the flow jumps to step 28 for deciding whether the registers are connected to the power supply. If an opening process has been unexecuted, at step 22 waiting continues until an opening process command arrives. When an opening process command arrives, at step 23 a decision is made whether there is data in the maintenance data storage area 18 in the controller for sales management 2, and if there is no data, the flow jumps to step 25 of giving a command directing the registers to execute an opening process.

When there is data in the maintenance data storage area 18, at step 24, from the maintenance data storage area 18, the executable program for the controller is copied to the executable program area 11, setting data is copied to the future setting data area 17, and further an executable program for the register is copied to the area 19 for storing the register executable program currently in use. Maintenance data is stored in the maintenance data storage area (directory) 18. Normally, the executable program and the setting data, when stored, are divided into a plurality of files, which are respectively given file names, so the executable program or data to be altered can be searched by file names and placed in the maintenance data area, and can therefore be altered by batch alteration or in file units. At step 25 of an opening process, an opening process command is sent through the communication line 3 to the respective registers, and at step 26 the sales data areas 12 to 15 in the controller are cleared, and at step 27 future setting data 17 is copied to the currently used setting data area 16.

Then, at step 28 a decision is made whether power-on information has arrived through the communication line 3 from each register, and if the decision is NO, the flow advances to step 30 of adding up sales, and when power-on information arrives from a register 1, at step 29 the contents of the storage area 19 of the executable program for the controller 2 for sales management is sent through the communication line 3 to the register 1 where the power supply is turned on.

At step 30 of adding up sales, the controller 2 sums up sales data sent from the registers 1 and sets maintenance data, and when it is necessary to alter the executable program and setting data, at step 31 the program or data to be altered are set in the maintenance data area 18, and at step 32 a decision is made whether a closing process command has been given, and if the decision is NO, the flow goes back to step 28 of deciding whether power-on information has arrived from the register, and steps 28 to 32 are repeated until a closing process command is issued.

When a closing process command is issued, at step 33 the controller sends a closing process command to the registers through the communication line 3, and at step 34 the controller prepares and prints out a report on sale data. When a closing process is finished, the flow goes back to step 22 of deciding whether an opening process command has arrived.

In FIG. 4, when power supply to a register 1 is turned on, at step 41, information that the power supply has been turned on, along with the register number, is given to the controller for sales management 2 to inform that the register 1 has been connected to the POS system, at step 42 the register 1 receives an executable program from the controller 2 and has the program updated, at step 43 a decision is made whether an opening process has been unexecuted, and if an opening process has been executed (decision: NO), the flow advances to step 47 where the register sums up sales proceeds. If an opening process has been unexecuted (decision: YES), at step 44 the register 1 waits for an opening process command, and when the command is issued, at step 45 setting data from the controller for sales management 2 is copied to the setting data area 113 in FIG. 11, and at step 46 sales data area 112 is cleared.

Then, at step 47, sales proceeds are summed up, and sales data is sent to the controller for sales management 2. At step 48 a decision is made whether a closing process command has been issued, and if the command has not been issued (decision: NO) the flow goes back to step 47, and steps 47 and 48 are repeated. If the command has been issued (decision: YES), the flow goes back to step 44.

As has been described, according to the first embodiment, the controller for sales management 2 includes a function to set maintenance data, a function to decide whether there is maintenance data at the time of an opening process, a function to detect that the register 1 is connected to the system and a function to send maintenance data to the register 1 to update the setting data, and by sending maintenance data from the controller for sales management 2 to the register connected to the POS system to execute an opening process, it is possible to alter the executable program and setting data in the daytime, thus obviating the need to work at night, so that the maintenance cost can be reduced and the burden on the maintenance personnel can be lessened. Batch alteration of the executable programs of the registers 1 can be performed by the controller for sales management 2, so that the working man-hours can be reduced.

(Second Embodiment)

Figure 5:
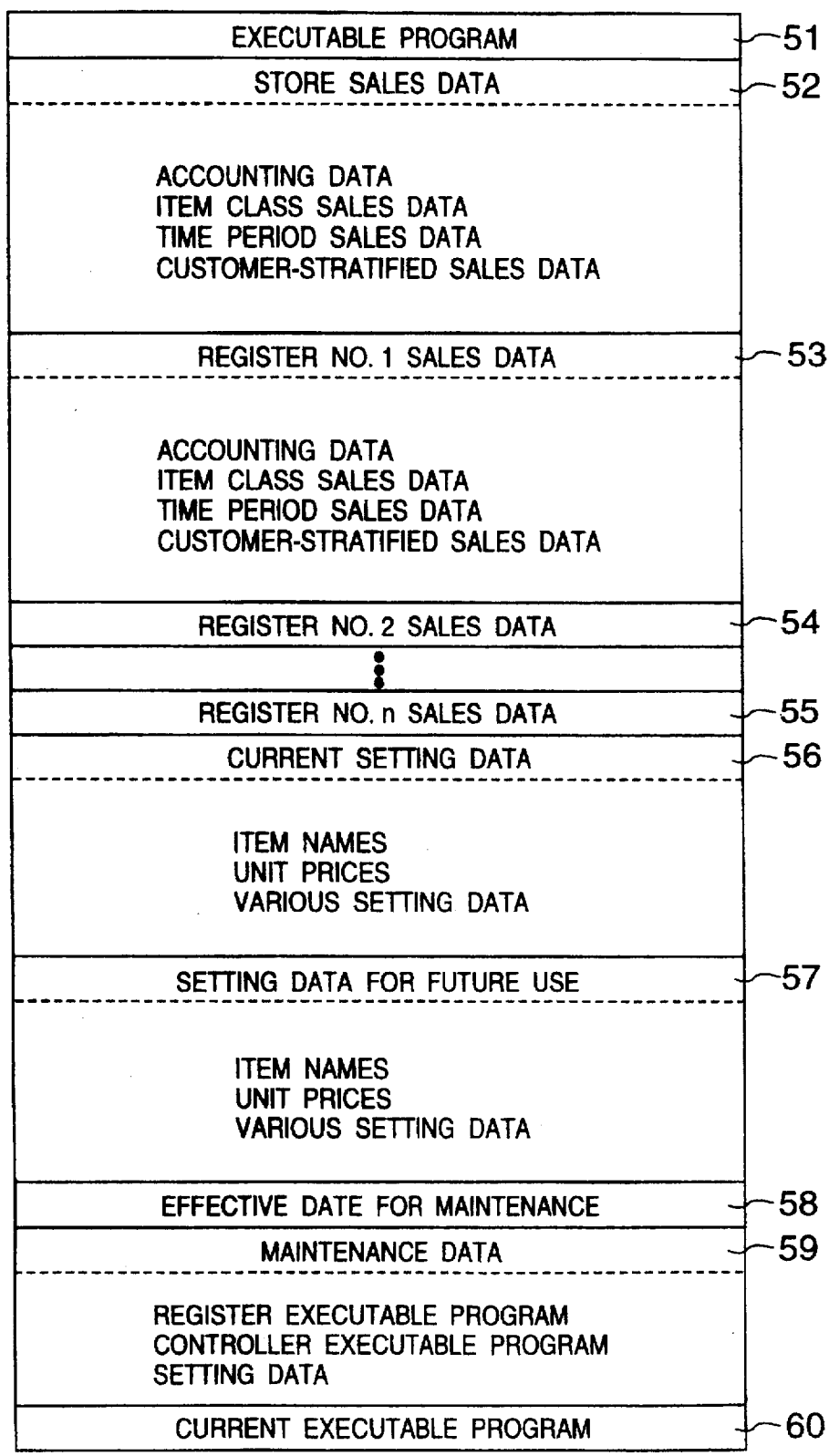
FIG. 5 is a schematic diagram showing the memory layout of the controller for sales management according to a second embodiment of the present invention.
Figure 6:
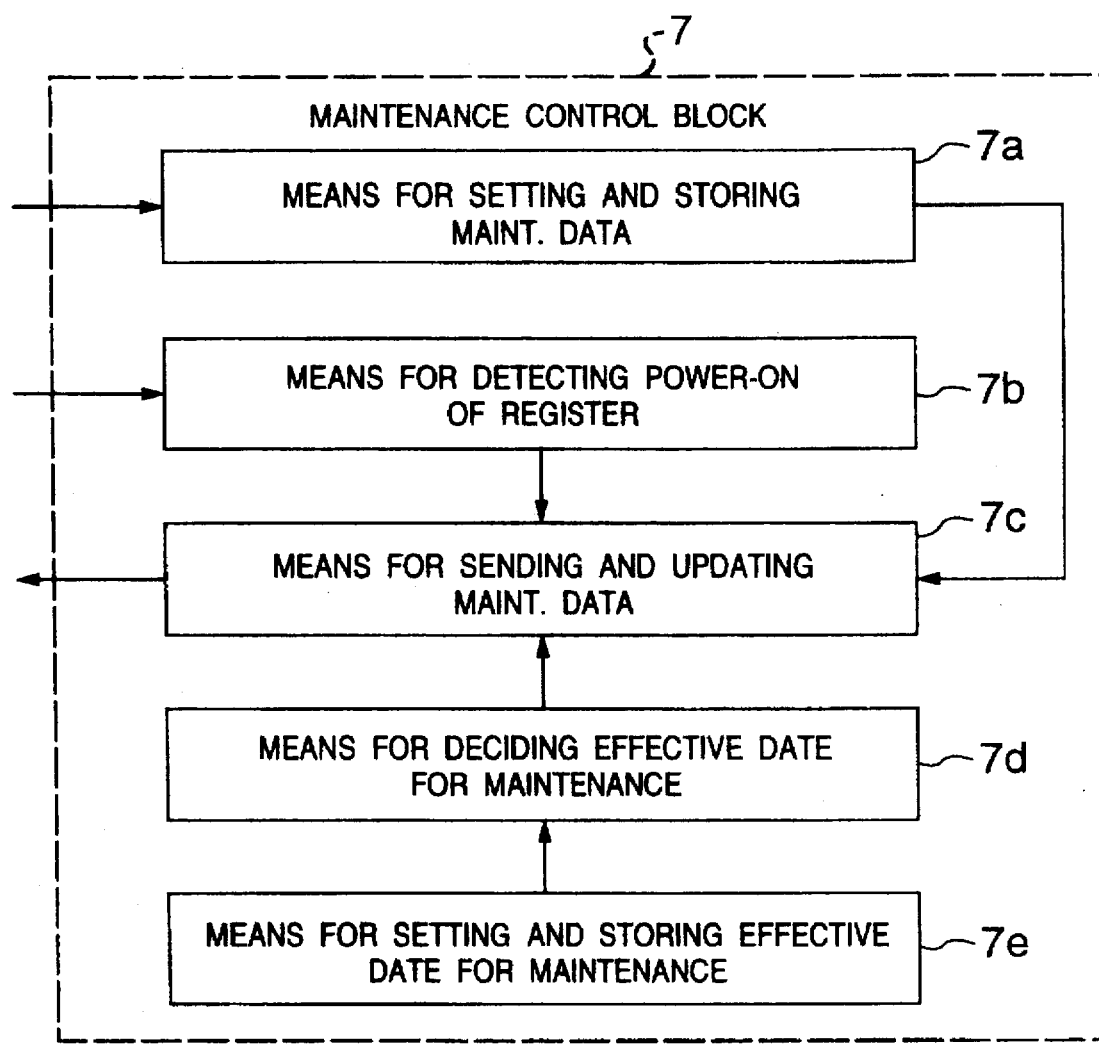
FIG. 6 is a schematic block diagram showing the composition of the maintenance control block according to the second embodiment of the present invention.

FIG. 5 shows the memory layout of the controller for sales management according to a second embodiment of the present invention. In this second embodiment, the controller for sales management is configured such that the maintenance control block 7 includes means 7e for setting and storing an effective date which permits maintenance work to be carried out and means 7d for deciding whether the effective date is reached by counting days (FIG. 6), but the memory layout of the registers is the same as shown in FIG. 11. In FIG. 5, reference numeral 51 denotes an area for storing an executable program (control program) of the controller for sales management 2, 52 denotes an area for storing sales data of the whole store, 53 denotes an area for storing sales data at register No. 1, 54 denotes an area for storing sales data at register No. 2, 55 denotes an area for storing sales data at register No. n, 56 denotes an area for storing setting data such as names and unit prices of items, a receipt message currently in use, 57 denotes an area for storing setting data to be used in the future, 58 denotes an area for storing an effective date which permits maintenance work to be done, 59 denotes an area for storing maintenance data, and 60 denotes an area for storing an executable program currently in use.

Figure 7:
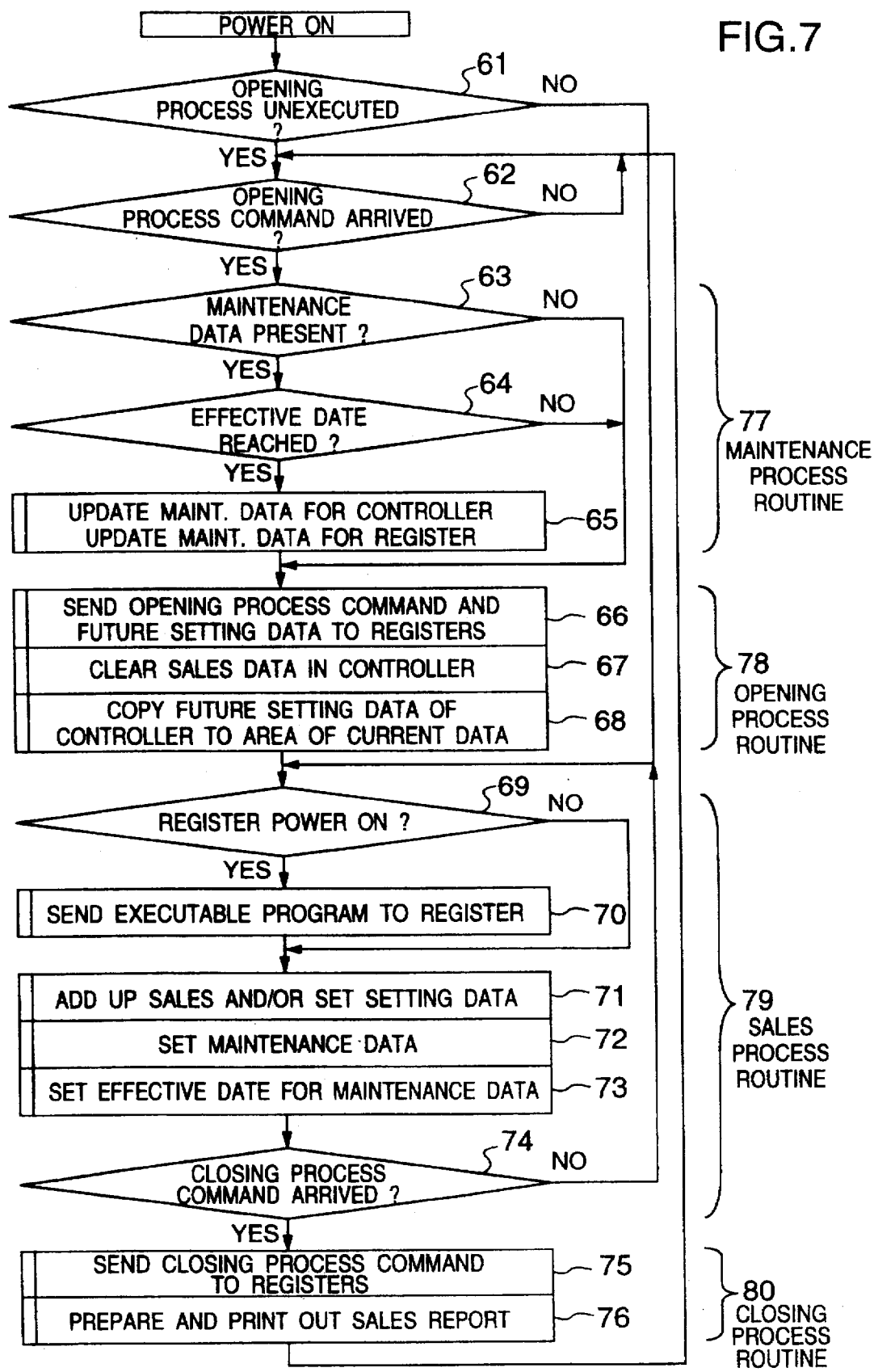
FIG. 7 is a flowchart showing the operation of the controller for sales management according to the second embodiment of the present invention.

FIG. 7 is a flowchart showing the flow of control operation of the controller for sales management 2. In FIG. 7, 61 denotes a step of deciding whether an opening process has been unexecuted, and 62 denotes a step of deciding whether an opening process command has arrived. Steps 63 to 65 constitute a maintenance process routine 77, steps 66 to 68 constitute an opening process routine 78, steps 69 to 74 constitute a sales process routine 79, and steps 75 and 76 constitute a closing process routine 80.

Description will now be made of the operation in the second embodiment mentioned above. In FIG. 7, when the power supply to the controller for sales management 2 is turned on, at step 61 a decision is made whether an opening process has been unexecuted, and if an opening process has been executed (decision: NO), the flow jumps to step 69 of deciding whether the registers are connected (power on). If an opening process has been unexecuted (decision: YES), at step 62 a decision is made whether an opening process command has arrived. When an opening process command is issued, at step 63 a decision is made whether there is data in the maintenance data storage area 59 in the controller for sales management 2, and if there is not data, the flow jumps to step 66 of the opening process routine. If there is data, at step 64 a decision is made whether the date obtained by the controller for sales management 2 by counting days has reached an effective date set in the maintenance effective date storage area 58, and if the date obtained by the controller for sales management 2 by counting days has not reached the effective date, the flow jumps to step 66 of the opening process routine. If the effective date has been reached, at step 65, from the maintenance data area 59, the executable program for the controller is copied to the executable program area 51, the setting data is copied to the future setting data area 57, and the executable program for the register 1 is coped to the area 60 for storing the register executable program currently in use. At step 66, an opening process command is sent through the communication line 3 to the registers 1, at step 67 the sales data areas 52 to 55 in the controller 2 are cleared, and at step 68 the future setting data 57 is copied to the area 56 for setting data currently in use.

Then, at step 69, the controller decides whether it has received power-on information from the registers through the communication line 3, and if the controller has not received the information, the flow jumps to step 71 of summing up sales, and if the controller has received the information, at step 70 the contents of the area 60 for the executable program of the register 1 is sent through the communication line 3 to the registers at which the power supply has been turned on.

At step 71, sales data sent from the registers 1 is summed up, and future setting data is set, and when it is necessary to alter the executable program or setting data structure, at step 72 the program or data to be altered is stored in the maintenance data area 59, at step 73 the date when maintenance data becomes effective is set, then at step 74 a 'decision is made whether a closing process command has been issued, and if this command has not been issued, the flow goes back to step 69, and steps 69 to 74 are repeated until a closing process command is issued.

When a closing process command is issued, at step 75 the command is sent to the registers through the communication line 3, and at step 76 the controller prepares and prints out a report on sales data. When a closing process is jumps back to step 62.

The operation of the registers is the same as in the first embodiment, so its description is omitted.

As is clear from the above description, according to the second embodiment, the controller for sales management 2 includes a function to set an effective date which permits maintenance work to be done, and a function to decide whether there is maintenance data and whether the effective date has passed at the time of an opening process. The controller for sales management 2 sends to the registers connected to the system maintenance data, which has reached the effective date to allow the maintenance data to be used in maintenance during an opening process, and this obviates the need to secure a large number of maintenance personnel to do maintenance work at the stores concerned all at once on the day previous to the day when new data is required. For this reason, the maintenance costs can be reduced and the burden on the maintenance personnel can be lightened. Another effect is that batch alteration of the executable programs of the registers 1 can be done by the controller for sales management 2, thereby reducing the working man-hours.

(Third Embodiment)

FIG. 8 is a schematic block diagram of the POS system according to a third embodiment of the present invention. The POS system in FIG. 1A showing the first and second embodiments is installed in a plurality of stores. The POS systems are connected by a communication line 3 such as the public line of telecommunication, and maintenance data is sent from the maintenance terminal 9 through the communication line and the controller for sales management 2 to the respective registers 1 in each store. The maintenance terminal 9 sets an executable program, various setting data structures, the above-mentioned effective date, store numbers, etc., and sends maintenance data including those items of maintenance data to the controller for sales management 2 in each store.

Figure 9A:
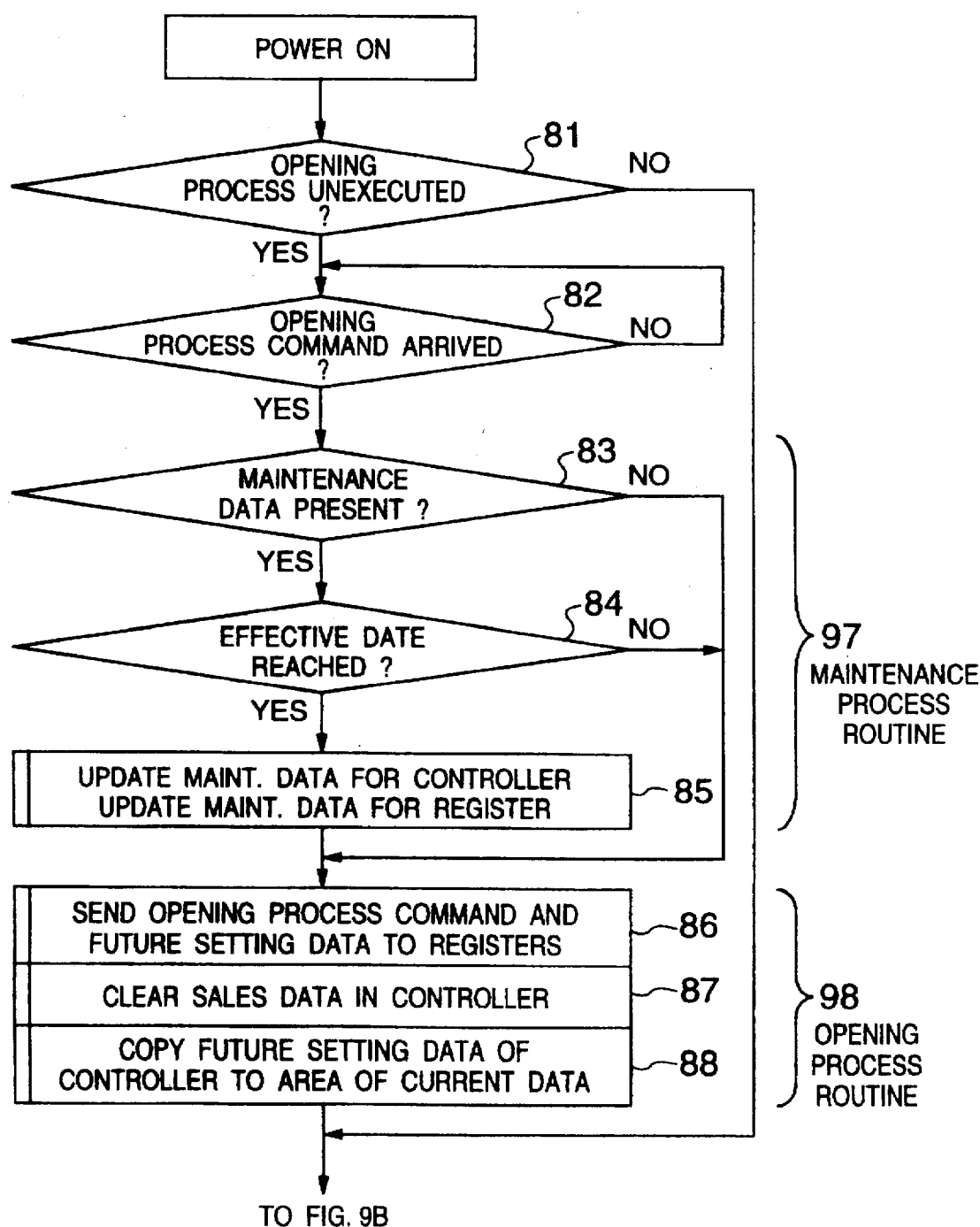
FIG. 9A is a flowchart (former half) showing the operation of the controller for sales management according to the third embodiment of the present invention.
Figure 9B:
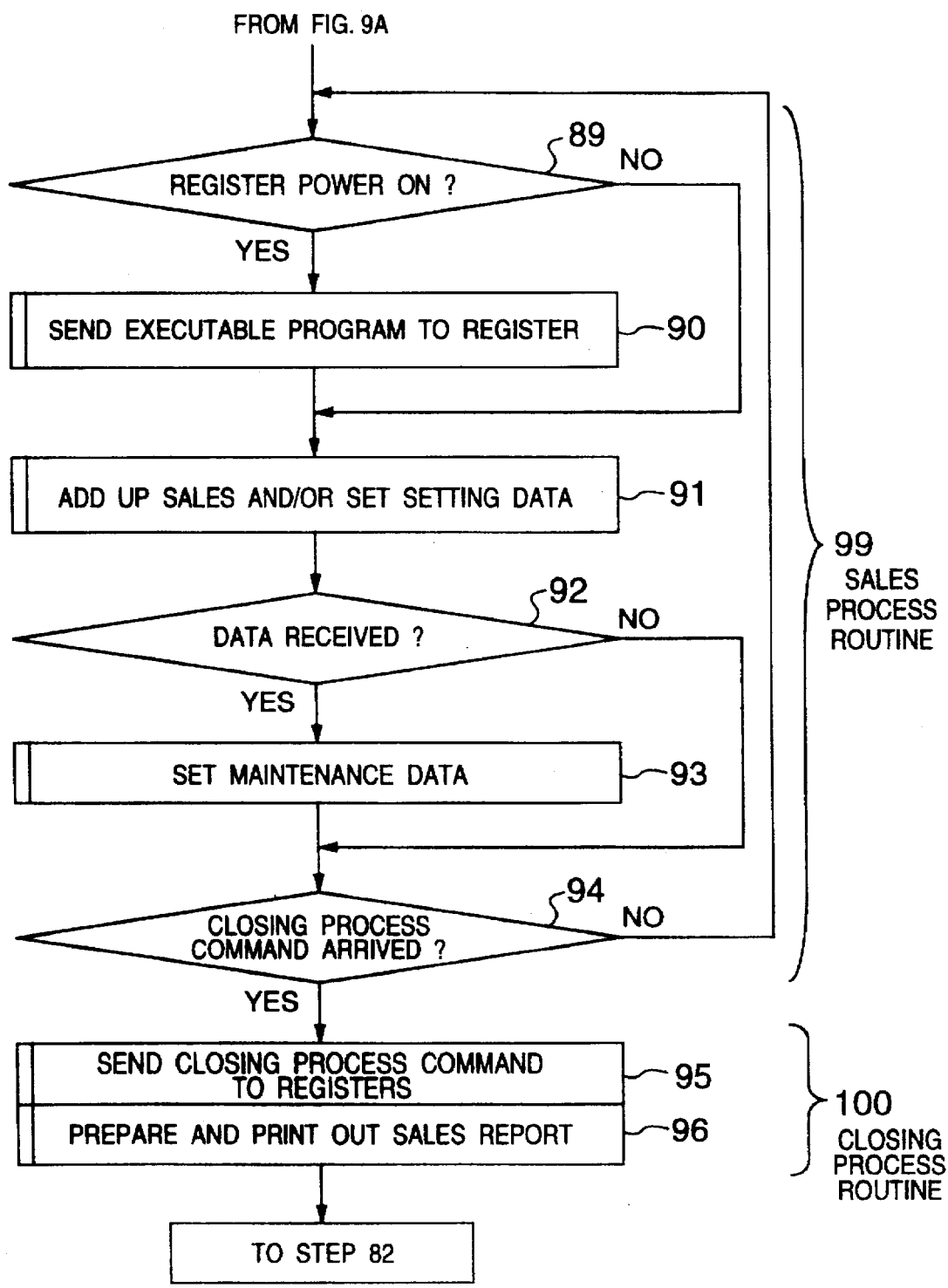
FIG. 9B is a flowchart (latter half) showing the operation of the controller for sales management according to the third embodiment of the present invention.
Figure 10:
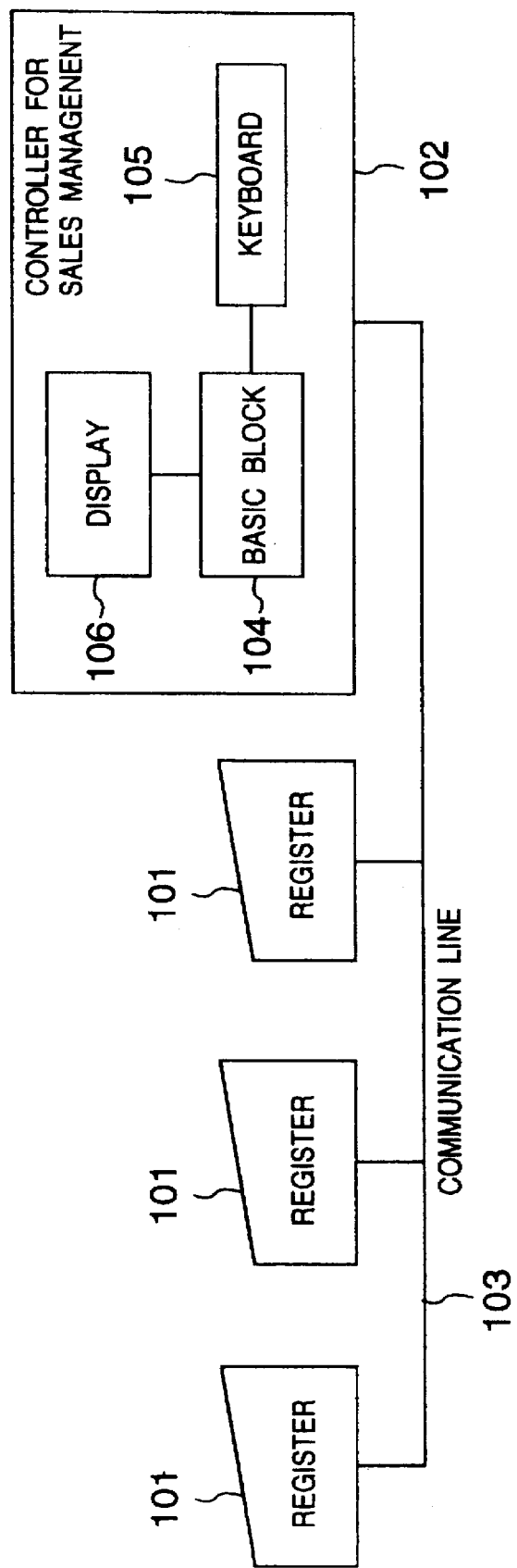
FIG. 10 is a schematic block diagram showing the composition of the conventional POS system.

FIGS. 9A and 9B are flowcharts showing the flow of control operation of the controller for sales management 2 according to a third embodiment of the present invention. Reference numeral 81 of FIG. 9A denotes a step of deciding whether an opening process has been unexecuted, and 82 denotes a step of deciding whether an opening process command has been received. Steps 83 to 85 constitute a maintenance process routine 97, and steps 86 to 88 constitute an opening process routine 98. Steps 89 to 94 of FIG. 9B constitute a sales process routine 99, and steps 95 and 96 constitute a closing process routine 100.

Description will now proceeds to the operation of the third embodiment mentioned above. In the POS systems in some stores as shown in FIG. 8, like in the first and second embodiments, an opening process, a sales process and a closing process are performed by the 15 registers 1 for entering orders and processing accounts, the controllers for sales management 2 for managing the whole stores, and the communication line connecting the registers 1 with the controllers for sales management. The controllers for sales management 2 and the maintenance terminal 9 are connected by the communication line, and the maintenance terminal 9 has a function to set an executable program, various data structures, an effective date mentioned above, store numbers, etc., and sends data through the communication line to the respective stores when maintenance is required.

In FIGS. 9A and 9B, when the power supply to the controller for sales management 2 is turned on, at step 81 a decision is made whether an opening process has been unexecuted, and if an opening process has been executed (decision: NO), the flow jumps to step 89 of a decision about connection of the register to the system. If an opening process has been unexecuted (decision: YES), the controller waits for an opening process command to arrive at step 82. When the command to execute an opening process is issued, at step 83 a decision is made whether there is data in the maintenance data area 59 in the controller for sales management, and if there is no data, the flow jumps to step 86. If there is data, a decision is made at the time of an opening process whether the date obtained by the controller for sales management 2 by counting days has reached the effective date set in the maintenance effective date current area, and if the effective date has not been reached, the flow jumps to step 86 of the opening process routine. If the effective date has been reached, at step 85, from the maintenance data area 59, the controller executable program is copied to the executable program area 51, setting data is copied to the future setting data area 57, and the executable program of the registers 1 is copied to the area 60 for a register executable program currently in use. At step 66, an opening process command is sent through the communication line to the registers 1, the sales data areas 52 to 55 in the controller for sales management 2 are cleared, and at step 88 future setting data is copied to the area 56 for setting data currently in use.

Then, at step 89 the controller makes a decision whether it has received power-on information from the registers 1 through the communication line 3, and if the controller has not received the information, the flow jumps to step 91 of summing up sales, and when power-on information is received, at step 90 the contents of the area 60 for an executable program of the registers 1 are sent through the communication line 3 to the registers 1 where the power supply is turned on.

At step 91 of summing up sales, sales data sent from the registers is summed up, and if necessary, future setting data peculiar to the respective stores are set, and at step 92 of decision about data reception, if the controller has not received data from the maintenance terminal 9, the flow jumps to step 94 of decision about reception of a closing process command, and if an executable program or setting data has been received from the maintenance terminal 9, at step 93 of setting maintenance data, received data is stored in the maintenance data area 59. If a closing process command has not been received, steps 89 to 94 are repeated until this command is issued.

On receiving a closing process command, the controller sends a closing process command to the registers through the communication line 3, and prepares and prints out a report on sales data. When a closing process is finished, the flow jumps to step 82.

The operation of the registers 1 is the same as in the first embodiment, so its description is omitted.

According to the third embodiment of the present invention, the maintenance terminal 9 has a function to transmit maintenance data to the controller for sales management 2 of each store, by which a new executable program for the POS system and various items of data can be set by remote control. Therefore, maintenance personnel need not be dispatched to the stores concerned to alter data, and when an effective date for maintenance arrives, data need not be sent all at once to a number of stores, such as chain stores, on the day previous to the day when new data is required. So, each time the need arises, data is transmitted to the registers connected to the system for their opening process. It is not necessary to secure a number of communication lines, and therefore the maintenance cost can be reduced and the burden of public line charges can be lessened. If the maintenance terminal is provided with a function to receive information from the respective stores, it becomes possible to perform trouble cause analysis of the equipment in the stores by a remote operation.

As is clear from the embodiments mentioned above, the present invention makes it possible to update the executable program and various items of setting data during an opening process, and facilitates the maintenance of the executable program and various items of setting data even in the daytime without disturbing the store operation. Further, the present invention offers another effect that it is possible to collectively control the executable programs and setting data of the POS system. Further, yet another effect of the present invention is that it makes unnecessary for a large number of maintenance personnel to set a new executable program on the POS system and various setting data on the day previous to the day they are used. Further, still another effect is that the present invention enables an executable program of the POS system and other setting data to be set by remote setting, and obviates the need to dispatch maintenance personnel to the stores for maintenance work.

I claim:

1. A POS system comprising:
   a plurality of registers each for entering data on items to be sold and processing accounts on the basis of a control program and various setting data; and
   a controller for sales management, connected through a communication line to said plurality of registers, for managing sales of a whole store, and setting at least kinds and unit prices of items dealt in said store, said controller for sales management comprising a maintenance control block, including:
   means for entering and storing maintenance data for updating said control program and/or said various setting data of said registers;
   means for detecting that a power supply to said registers is turned on to execute an opening process of said store; and
   means for, after detecting that the power supply to said registers is turned on, sending said maintenance data to said store when there is said maintenance data, and updating said control program and/or said various setting data of said registers.

2. A POS system according to claim 1, wherein said maintenance control block includes means for entering and storing an effective date for executing maintenance work, and means for counting days and deciding whether a date obtained by counting days has reached said effective date, and wherein said maintenance data sending means sends said maintenance data to each of said plurality of registers when said date obtained by counting days has reached said effective date.

3. A POS system according to claim 1, wherein said plurality of registers and said controller for sales management are installed in each of said plurality of stores, and are connected by a communication line, and wherein said POS system further comprises a maintenance terminal, connected to said communication line, for sending said maintenance data to said plurality of registers through said controller for sales management of each of said plurality of stores.

4. A POS system according to claim 2, wherein said plurality of registers and said controller for sales management are installed in each of said plurality of stores, and are connected by a communication line, and wherein said POS system further comprises a maintenance terminal, connected to said communication line, for sending said maintenance data to said plurality of registers through said controller for sales management of each of said plurality of stores.

* * * * *